R. J. BURROWS.
INTERNAL GEAR DRIVE AXLE FOR MOTOR VEHICLES.
APPLICATION FILED JUNE 18, 1917.
1,334,279.
Patented Mar. 23, 1920.
4 SHEETS—SHEET 1.
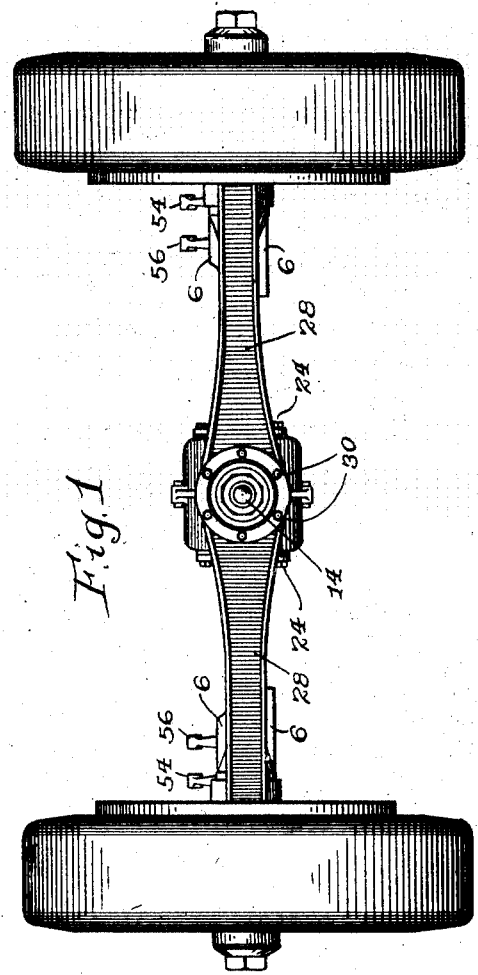
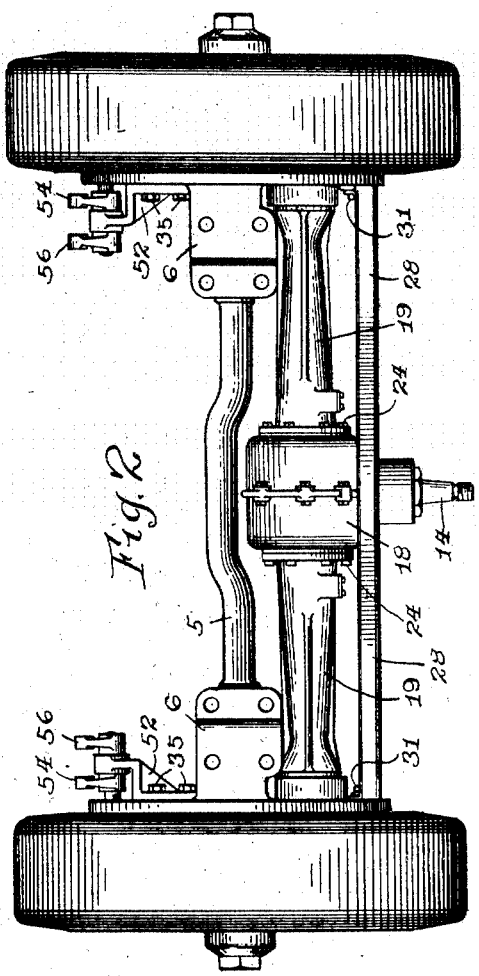

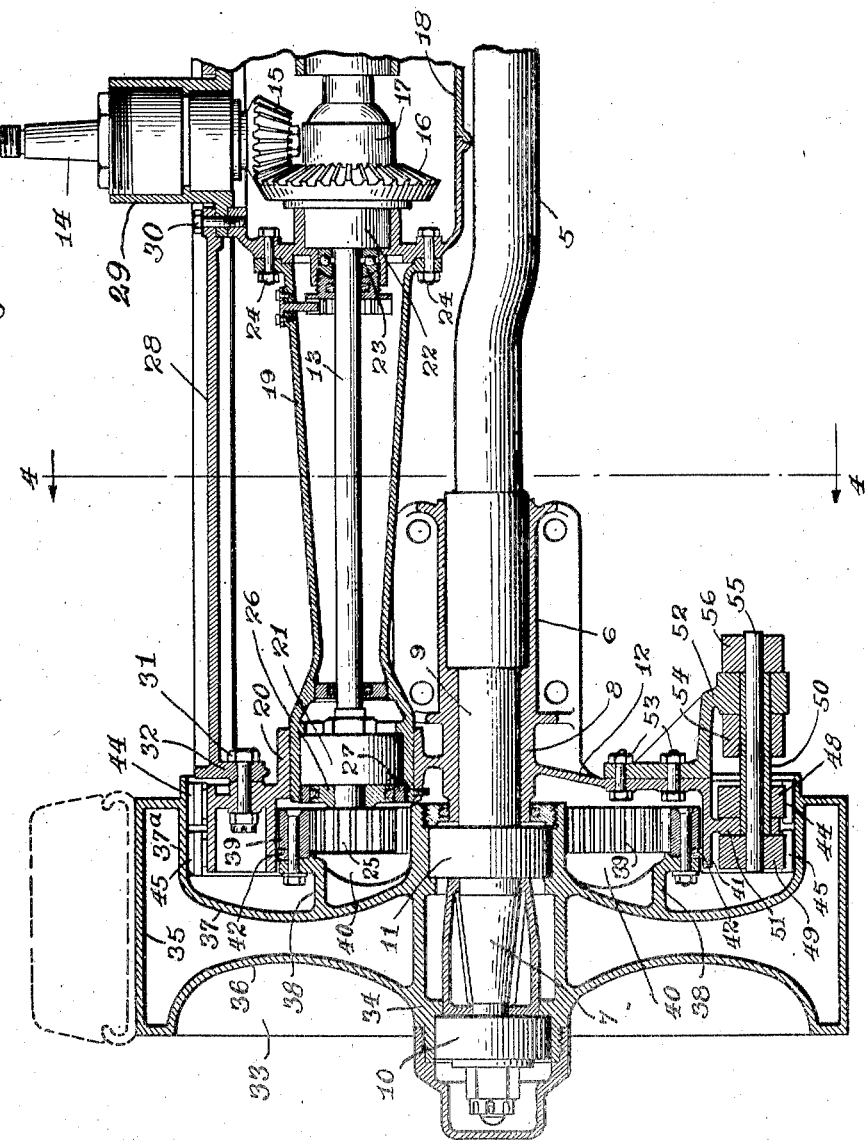

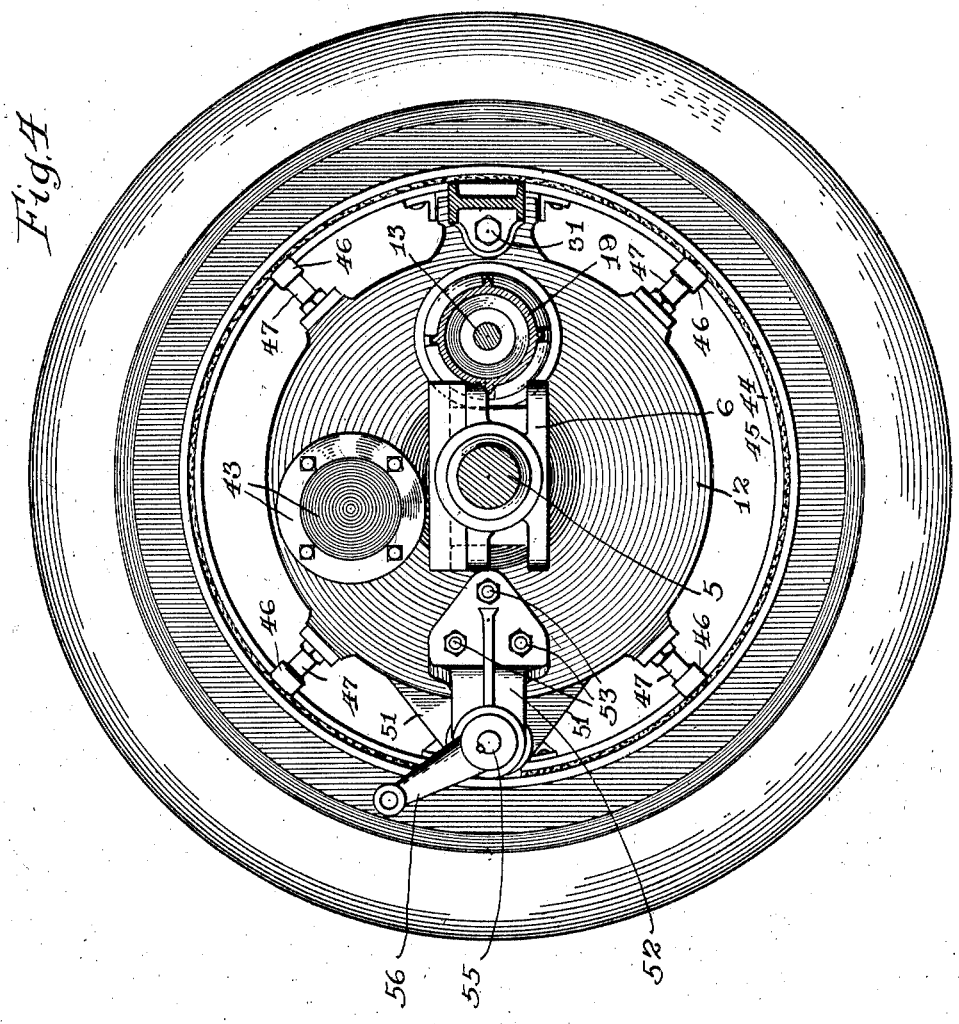

R. J. BURROWS.
INTERNAL GEAR DRIVE AXLE FOR MOTOR VEHICLES.
APPLICATION FILED JUNE 18, 1917.

1,334,279.

Patented Mar. 23, 1920.
4 SHEETS—SHEET 4.

Witness:
L. B. Graham

Inventor:
Robert J. Burrows,
By Adams & Jackson
Attys.

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

INTERNAL-GEAR DRIVE-AXLE FOR MOTOR-VEHICLES.

1,334,279.    Specification of Letters Patent.    Patented Mar. 23, 1920.

Application filed June 18, 1917. Serial No. 175,509.

*To all whom it may concern:*

Be it known that I, ROBERT J. BURROWS, a citizen of the United States, and a resident of Buchanan, in the county of Berrien and State of Michigan, have invented certain new and useful Improvements in Internal-Gear Drive-Axles for Motor-Vehicles, of which the following is a specification, reference being had to the accompanying drawings.

My invention relates to wheels and axles for motor vehicles and particularly to those suitable for use on heavy vehicles such as trucks.

The type of motor truck axle which is well-known comprises two principal members, one being what is commonly termed the dead axle member which carries the wheel spindles, and the other a live axle member composed of two jack shafts arranged parallel with the dead axle member and driven from the vehicle motor through a propeller shaft and the usual differential gearing. These jack shafts are usually provided at their outer ends with spur pinions which mesh with gears internal or external carried by the rear wheels so that the rotation of the jack shafts propels the vehicle. My present invention has to do not only with certain improvements in the construction of the axle as a whole considered apart from the wheels, but also includes certain improved combinations of which wheels of characteristic construction are elements, as will hereinafter be more fully explained. Briefly stated, the principal objects of my invention are to provide a gear drive axle suitable for heavy vehicles in which ample provision will be made for taking care of all the torque set up; to provide a construction by which the driving gears by which power is transmitted to the wheels will be self lubricating; to provide improved braking mechanism; to protect the braking mechanism fully from the lubricant applied to the driving gears; to provide a construction by which ready access may be had to the driving gears and brakes, and by which also the parts of the axle may readily be assembled or dismantled; and to secure increased traction surface without increasing the tread of the vehicle. I accomplish these objects as illustrated in the drawings and as hereinafter specifically described. That which I believe to be new will be set forth in the claims.

In the accompanying drawings:

Figure 1 is a front elevation of the rear axle embodying my improvements;

Fig. 2 is a plan view thereof;

Fig. 3 is an enlarged detail, being a horizontal sectional view of somewhat more than half of the axle, one of the wheels being also shown in section;

Fig. 4 is a vertical cross-section on line 4—4 of Fig. 3;

Figure 5:
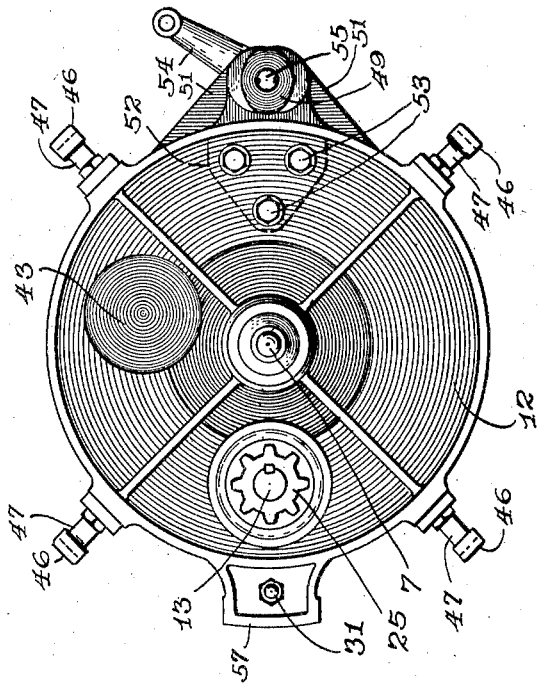
Fig. 5 is an inside face view of the brake-supporting disk and some of the parts mounted thereon.

Referring to the drawings, 5 indicates the principal member of the dead axle element which is preferably a steel bar circular in cross-section, but it may be of any other suitable shape. In the construction illustrated the central portion of said member is offset to provide greater space for the differential housing, but this is not essential. The dead axle member 5 carries split boxes 6 at its ends which not only serve as the usual seats for the attachment of the rear springs of the vehicle, but also serve as means for supporting the wheel spindles 7. To this end said boxes are provided with sleeve portions 8 which receive stub shafts 9 formed integral with and projecting inwardly from the spindle 7, as shown in Fig. 3. The spindles 7 are adapted to support roller bearings 10—11 with which the wheels hereinafter described are provided. The boxes 6 also carry disks or plates 12 which support the brake levers, the live axle housing, and the certain other parts which will be hereinafter described.

13 indicates one of the jack shafts or live axle members. These jack shafts are disposed in front of and parallel with the dead axle member 5 and constitute the means by which power is transmitted from the differential gearing to the wheels, as hereinafter suggested. 14 indicates the rear member of a propeller shaft which is connected up with the usual motor and carries a bevel pinion 15 which meshes with the main drive gear 16 of the differential gearing as shown in Fig. 3. 17 indicates a housing which incloses part of the differential gearing, and 18 indicates the main differential housing which incloses the pinion 15, gear 16 and connected parts. Said housing 18 is provided at opposite sides with sleeves 19 which extend from the housing 18 to the disks 12, the outer ends of said sleeves being fitted in suitable sockets provided in said disks as shown at 20 in Fig. 3. The disks 12 thus serve to position the outer ends of the sleeves 19 and hold them in place. The outer end portions of the jack shafts 13 are provided with roller bearings 21 which operate in the outer ends of the sleeves 19, similar bearings 22 being also provided at the inner ends of said jack shafts. In addition, the inner ends of the jack shafts are provided with anti-friction thrust bearings 23 as shown in Fig. 3. The sleeves 19 are secured to the housing 18 by bolts 24 so that they may readily be disconnected when necessary.

At their outer ends the jack shafts 13 are provided with spur pinions 25, as shown in Fig. 3, and between said pinions and the roller bearings 21 are fitted spacing disks 26 which fit closely upon the jack shafts 13 and lie inside of ring nuts 27 screwed into the outer ends of the sleeves 19.

28 indicates a torque bar preferably in the form of an I-beam which is disposed in front of the live axle housing and is parallel with the axle member as shown in Figs. 2 and 3. Said torque bar is perforated at the center to fit over the propeller shaft housing 29 and is secured to said housing and to the housing 18 by bolts 30. The outer ends of said torque bar are secured to the disks 12, near the peripheries thereof, by bolts 31 which pass through inturned flanges 32 provided at the ends of said torque bar. The ends of the torque bar are thus rigidly connected with the boxes 6 and through them with the dead axle member 5, and consequently, as the springs are bolted directly to the boxes 6, the driving strains are transmitted to and absorbed by the vehicle springs. The torque bar 28 may readily be removed by removing the bolts 30 and 31.

33 indicates the wheels, which, as best shown in Fig. 3, are of metal and comprise a hub 34 which carries the roller bearings 10—11, and a box-like rim structure 35 connected with the hub by oppositely-curved webs 36—37. The rim 35 is not disposed symmetrically with reference to the hub, but is extended inwardly a considerable distance and the outer portion of the web 37 is flattened as shown at 37ª to form a braking surface or brake drum near the tread of the wheel, as pointed out in my pending application, Serial No. 168,670, filed May 15, 1917, in which the wheel *per se* is more particularly described and claimed. The web 37 is also provided intermediately with a laterally-projecting flange 38 to which is attached an internal gear ring 39 which intermeshes with the driving pinion 25. Between the flange 38 and the hub of the wheel is a space 40, which, when the wheel is applied to the axle, forms with the disk 12 an annular chamber adapted to contain a suitable lubricant for the gear 29 and pinion 25. As shown at 41 in Fig. 3, said ring 12 is provided with a flange which extends over the outer surface of the gear 39 and a packing ring 42 is fitted between the said flange and gear ring to prevent leakage of the lubricant between said parts. By this construction the chamber 40 may be filled with lubricant at comparatively long intervals. Consequently the gears are maintained in a proper state of lubrication without requiring much attention. This is an important consideration as drivers are prone to neglect such matters. For the purpose of facilitating the introduction of the lubricant, the disk 12 is provided with a suitable filling opening covered by a removable plate 43, as shown in Fig. 4. By removing said plate access may readily be had to the chamber 40 for supplying lubricant thereto or for examining the gears.

Figure 6:
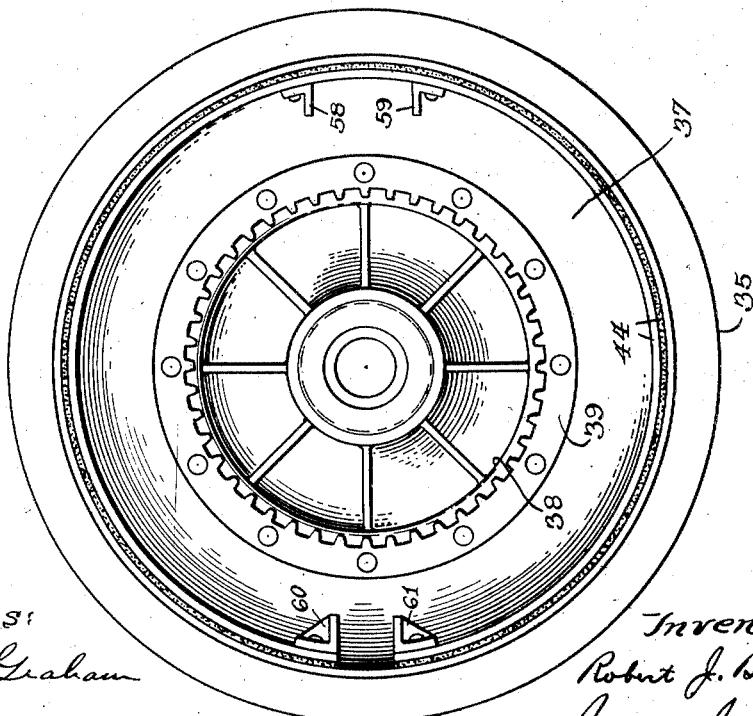
Fig. 6 is an elevation of the inside face of one of the wheels dismounted, showing the brakes in position.

44—45 indicate two expanding brakes of the usual type which are supported by the disk 12 which for that purpose is provided with a series of stirrups 46 carried by rods 47 projecting at intervals from the periphery of said disk, as shown in Fig. 4. Said stirrups are wide enough to accommodate the two brakes side by side and are in such position as to hold them in close proximity to the flattened portion 37ª of the web 37 which constitutes the brake drum. 48—49 indicate cams for expanding the brakes 44—45 respectively, as shown in Fig. 3. The cam 48 is mounted on a tubular shaft 50 which at one end is supported in a radial flange 51 projecting from the flange 41 of the disk 12 and at its outer end is supported in a suitable bearing in a bracket 52 secured to the disk 12 by bolts 53. Said shaft carries an operating lever 54 by which it may be rocked. Mounted in the tubular shaft 50 is a second shaft 55 which at its inner end carries the cam 49 and at its outer end is provided with a lever 56 by which it may be rocked. Thus by rocking both levers 54—56 simultaneously the two brakes may be set at the same time, but either of said levers may be operated separately thereby applying only one of the brakes. In order to properly position the brake bands and prevent them from shifting endwise, the disk or plate 12 is provided with a peripheral lug 57, as shown in Fig. 5, and the brake bands are provided with lugs 58—59 spaced apart a distance equal to the width of the lug 57 so that when the parts are assembled the lugs 58—59 bear against the opposite ends of the lug 57. To provide extended surfaces for engagement by the brake-operating cams 48—49, the brake bands are also provided with lugs 60—61 adjacent to their separated ends, as shown in Fig. 6.

It will be noted that by the construction described the braking power is applied to the wheels very near the tread portion thereof, and moreover it is unnecessary to perforate the web 37, as would be required if separate brake drums were employed, so that the web is not weakened. An important advantage of the construction described is that the wheels may readily be removed without disconnecting or disarranging any of the other parts of the axle, as will be clearly understood from an inspection of Figs. 3, 5 and 6. To remove a wheel, the wheel cap and spindle nut are removed and the wheel and the roller bearings 10—11 may then be slipped off the spindle leaving the parts of the axle as they were, as shown in Fig. 5. A further advantage of this construction is that the brakes are substantially inclosed by the wheel rims and are consequently protected to a large extent against the admission of dust and dirt; also, as the brake drums are integral with the wheels they cannot work loose, and there are no bolts to become loose and drop off into the drive gears, which is a source of danger in some constructions employing separable brake drums. Furthermore, my improved construction makes practicable the use of wheels having very broad rims without widening the tread of the vehicle since the wheel members are extended inwardly and not outwardly beyond the normal width of the vehicle tread.

As will be seen from the foregoing description, certain of the advantages hereinbefore pointed out are incident to the combination of the particular wheel here shown and described with the members of the axle proper, but other features of my improved axle may be advantageously employed in connection with other types of wheels. In other respects, also, my invention is not limited to the specific construction shown and described except in so far as the claims hereinafter made are directed to such particular construction.

What I claim as my invention and desire to secure by Letters Patent, is—

1. An axle for motor vehicles comprising a dead axle member adapted to carry the vehicle wheels, spring supporting means carried by said dead axle member, a propeller shaft, differential gearing driven by said shaft, live axle members operatively connected with said differential gearing and with the vehicle wheels for driving said wheels, and a torque bar rigidly connected with the inner end portions of said live axle members and extending transversely of the vehicle substantially parallel with said live axle members, the outer end portions of said torque bar being rigidly connected with said spring supporting means.

2. An axle for motor vehicles comprising a dead axle member adapted to carry the vehicle wheels, spring supporting means carried by said dead axle member, a propeller shaft, differential gearing driven by said shaft, a housing for said differential gearing, live axle members operatively connected with said differential gearing and with the vehicle wheels for driving said wheels, and a torque bar rigidly connected intermediately with said differential housing and rigidly connected at its end portions with said spring supporting means, said torque bar being disposed substantially parallel with said live axle members.

3. An axle for motor vehicles comprising a dead axle member adapted to carry the vehicle wheels, spring supporting means carried by said dead axle member, a propeller shaft, differential gearing driven by said shaft, a housing for said differential gearing, said housing being disconnected from said dead axle member, live axle members connected with said differential gearing and with the vehicle wheels, and a torque bar connected intermediately with said differential housing and extending transversely of the vehicle substantially parallel with said live axle members, the end portions of said torque bar being rigidly connected with said spring supporting means.

4. In a motor vehicle, the combination of a dead axle member having wheel spindles, wheels mounted on said wheel spindles and having laterally projecting flanges at their inner sides, said flanges being concentric with the wheel spindles, and gears secured to said flanges, of live axle members substantially parallel with said dead axle member, means for driving said live axle members, pinions carried by said live axle members and meshing with said gears, plates carried by said dead axle member and having flanges which extend over said gears, forming chambers inclosing said gears and pinions, and a torque bar connected intermediately with said live axle members and extending transversely of the vehicle, the outer end portions of said torque bar being rigidly connected with said plates.

5. An axle for motor vehicles comprising a dead axle member and wheel spindles carried thereby, a live axle disposed parallel with said dead axle member and disconnected therefrom intermediately, pinions mounted on the end portions of said live axle, a torque bar connected intermediately with said live axle and disposed substantially parallel therewith, disks connected with said dead axle member and supporting the end portions of said live axle, the end portions of said torque bar being connected rigidly with said disks, brakes mounted upon said disks, and means for operating said brakes.

6. An axle for motor vehicles comprising a dead axle member and wheel spindles carried thereby, a live axle disposed parallel with said dead axle member and disconnected therefrom intermediately, pinions mounted on the end portions of said live axle, a torque bar connected intermediately with said live axle and disposed substantially parallel therewith, disks connected with said dead axle member and supporting the end portions of said live axle, the end portions of said torque bar being connected rigidly with said disks, brakes mounted upon said disks, and brake levers mounted on the dead axle member for operating said brakes.

7. An axle for motor vehicles comprising a dead axle member and wheel spindles carried thereby, a live axle disposed parallel with said dead axle member and disconnected therefrom intermediately, pinions mounted on the end portions of said live axle, a torque bar connected intermediately with said live axle and disposed substantially parallel therewith, disks connected with said dead axle member and supporting the end portions of said live axle, the end portions of said torque bar being connected rigidly with said disks, a plurality of brakes mounted on each of said disks, and means for operating said brakes.

8. An axle for motor vehicles comprising a dead axle member and wheel spindles carried thereby, a live axle disposed parallel with said dead axle member and disconnected therefrom intermediately, pinions mounted on the end portions of said live axle, a torque bar connected intermediately with said live axle and disposed substantially parallel therewith, disks connected with said dead axle member and supporting the end portions of said live axle, the end portions of said torque bar being connected rigidly with said disks, a plurality of brakes mounted on each of said disks, and a plurality of levers mounted upon the end portions of said dead axle member for operating said brakes.

9. An axle for motor vehicles comprising a dead axle member and wheel spindles carried thereby, live axle members disposed parallel with said dead axle member, plates mounted on the end portions of said dead axle member and supporting the end portions of said live axle members, a transversely disposed torque bar connected intermediately with said live axle members and having its end portions connected rigidly with said plates, brakes supported by said plates, and means for operating said brakes.

10. An axle for motor vehicles comprising a dead axle member and wheel spindles carried thereby, live axle members disposed parallel with said dead axle member, plates mounted on the end portions of said dead axle member and supporting the end portions of said live axle members, a transversely disposed torque bar connected intermediately with said live axle members and having its end portions connected rigidly with said plates, brakes supported by said plates, and means mounted on said plates for operating said brakes.

11. An axle for motor vehicles comprising a dead axle member, wheel spindles carried thereby, a live axle disposed parallel to said dead axle, disks non-rotatably supported on the end portions of said dead axle member and supporting the end portions of said live axle, expanding brakes mounted on the peripheries of said disks, and means carried by the dead axle member for operating said brakes.

12. An axle for motor vehicles comprising a dead axle member, wheel spindles carried thereby, a live axle disposed parallel to said dead axle, disks non-rotatably supported on the end portions of said dead axle member and supporting the end portions of said live axle, a plurality of expanding brakes on the periphery of each of said disks, and means carried by the dead axle member for operating said brakes.

13. An axle for motor vehicles comprising a dead axle member, wheel spindles carried thereby, a live axle disposed parallel to said dead axle, disks non-rotatably supported on the end portions of said dead axle member and supporting the end portions of said live axle, expanding brakes mounted on the peripheries of said disks, and means carried by the dead axle member for operating said brakes, in combination with wheels mounted upon said spindles, and gears carried by said wheels and operatively engaged by said live axle and having box-like rims overlying said disks and the brakes supported by said disks.

14. An axle for motor vehicles comprising a dead axle member, wheel spindles carried thereby, a live axle disposed parallel to said dead axle, disks non-rotatably supported on the end portions of said dead axle member and supporting the end portions of said live axle, a plurality of expanding brakes on the periphery of each of said disks, and means carried by the dead axle member for operating said brakes, in combination with wheels mounted upon said spindles, and gears carried by said wheels and operatively engaged by said live axle and having box-like rims overlying said disks and the brakes supported by said disks.

15. An axle for motor vehicles, comprising a dead axle member and wheel spindles carried thereby, a live axle member disposed in front of said dead axle member and disconnected therefrom intermediately, a torque bar substantially parallel with said live axle member and connected intermediately therewith, wheels mounted on said wheel spindles, gears carried by said wheels, pinions mounted on said live axle member and meshing with said gears, and means carried by said dead axle member for supporting the end portions of the live axle member and inclosing said gears, the end portions of said torque bar being rigidly connected with said means.

ROBERT J. BURROWS.